(12) United States Patent
Raju et al.

(10) Patent No.: US 9,985,550 B2
(45) Date of Patent: May 29, 2018

(54) SYSTEMS AND METHODS FOR REDUCING LOOP INDUCTANCE

(71) Applicant: General Electric Company, Schenectady, NY (US)

(72) Inventors: Ravisekhar Nadimpalli Raju, Clifton Park, NY (US); Manoj Ramprasad Shah, Latham, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 605 days.

(21) Appl. No.: 14/581,466

(22) Filed: Dec. 23, 2014

(65) Prior Publication Data

US 2016/0181947 A1    Jun. 23, 2016

(51) Int. Cl.
*H02M 7/00* (2006.01)
*H02M 7/537* (2006.01)
*H02M 7/5387* (2007.01)

(52) U.S. Cl.
CPC ......... *H02M 7/003* (2013.01); *H02M 7/5387* (2013.01)

(58) Field of Classification Search
CPC .............................. H02N 7/003; H02M 7/5387
See application file for complete search history.

(56) References Cited

U.S. PATENT DOCUMENTS

| | | | |
|---|---|---|---|
| 5,544,035 A | | 8/1996 | Beriger et al. |
| 5,798,916 A | * | 8/1998 | Stacey ................ H02H 7/1206 363/135 |
| 7,881,086 B2 | | 2/2011 | Nakayama et al. |
| 8,076,696 B2 | | 12/2011 | Beaupre et al. |
| 2003/0034239 A1 | * | 2/2003 | Chason ................ H05K 3/4092 200/181 |
| 2003/0164700 A1 | * | 9/2003 | Goldfine ................ G01N 27/82 324/235 |
| 2009/0201005 A1 | * | 8/2009 | Noma ..................... H02M 1/44 323/311 |
| 2010/0025126 A1 | * | 2/2010 | Nakatsu .................. B60L 11/00 180/65.1 |
| 2011/0249421 A1 | * | 10/2011 | Matsuo .................. B60K 6/445 361/821 |
| 2013/0187211 A1 | * | 7/2013 | Ejury .................... H01L 23/642 257/299 |

(Continued)

FOREIGN PATENT DOCUMENTS

WO    9804029 A1    1/1998

OTHER PUBLICATIONS

Li, Shengnan et al., "Stray Inductance Reduction of Commutation Look in the P-Cell and N-Cell-Based IGBT Phase Leg Module," Power Electronics, IEEE Transactions on, vol. 29; Issue: 7, Jul. 2014, pp. 3616-3624.

(Continued)

*Primary Examiner* — Jared Fureman
*Assistant Examiner* — Emmanuel R Dominique
(74) *Attorney, Agent, or Firm* — Nitin N. Joshi

(57) ABSTRACT

A method for use in reducing an inductance of a circuit including a commutation loop defined at least in part by a source conductor and a return conductor between a first component and a second component is described. The method includes disposing a conductive inductance reducer within the commutation loop. The conductive inductance reducer includes an electrically conductive material and an insulator.

12 Claims, 2 Drawing Sheets

(56) References Cited

U.S. PATENT DOCUMENTS

| | | |
|---|---|---|
| 2013/0271941 A1 | 10/2013 | Wei et al. |
| 2013/0343108 A1 | 12/2013 | Shepard |
| 2014/0062210 A1 | 3/2014 | Wagoner et al. |
| 2014/0111959 A1 | 4/2014 | Li et al. |
| 2014/0183550 A1* | 7/2014 | Reusch ............... H05K 1/0231 257/76 |

OTHER PUBLICATIONS

Wang, Zhiqiang, et al., "Study on Planar Busbar Regarding Stray Inductance Minimization and Oscillation Suppression for High Power Converter," International Conference on Sustainable power generation and supply 2009, Supergen '09, pp. 1-7.

* cited by examiner

SYSTEMS AND METHODS FOR REDUCING LOOP INDUCTANCE

BACKGROUND

This description relates to loop inductance in electrical circuits, and more particularly, to systems and methods for reducing loop inductance in electrical circuits.

Known electrical circuits often include sections in which a current passes from a first component to a second component and returns to the first component. The paths between the first and second component form a current loop. FIG. 1 is a diagram of a portion of an electrical circuit 10 including a current loop 15. The electrical circuit 10 is part of a power converter, e.g., an inverter or a multi-level converter. Current loop 15 includes a source conductor 20 and a return conductor 25. Circuit 10 includes phase leg 30 of a power converter coupled to a direct current DC link capacitor 35 by source conductor 20 and return conductor 25. Current loop 15 defines a loop area 40 within current loop 15. During operation of circuit 10, current passes around current loop 15, for example clockwise around loop 15. Current loop 15 has a parasitic inductance, sometimes referred to as a loop inductance, that depends on the shape and size of current loop 15. The inductance of current loop 15 is proportional to the area of loop area 40. Unintended loop inductance may cause malfunctioning in electrical circuits. In general circuit designers identify sources of loop inductance, calculate the inductance, and factor the loop inductance into the circuit design to permit the circuit to operate as intended. Loop inductance may result in relatively large voltage overshoot and ringing in switching circuits, such as circuit 10.

Some known systems attempt to reduce the inductance of current loops by placing source and return conductors closer together, thereby reducing the area of the current loop. In high voltage circuits, however, source and return conductors located close together may be susceptible to arcing and insulation breakdown. Other known systems attempt to reduce loop inductance by using wide conductive plates separated by insulation, rather than wires, for the source and return conductors. Electrical circuits using wide plates instead of wires can be more expensive, more difficult to construct, and larger than wire based systems. Another known method to reduce loop inductance is to use a twisted pair of wires for the source and return conductors, but this can be difficult to construct for high voltage and high current use.

BRIEF DESCRIPTION

In one aspect, a method for use in reducing an inductance of a circuit is provided. The circuit includes a commutation loop defined at least in part by a source conductor and a return conductor between a first component and a second component. The method includes disposing a conductive inductance reducer within the commutation loop. The conductive inductance reducer includes an electrically conductive material and an insulator.

In another aspect, a circuit is provided. The circuit includes a first component, a second component, a source conductor coupled between the first and second components, and a return conductor coupled between the first and second components. A commutation loop having an inductance is defined, at least in part, by the source and return conductors. The circuit includes a conductive inductance reducer disposed in the commutation loop to reduce the inductance of the commutation loop.

In a further aspect, a power converter is provided. The power converter includes a phase leg, a direct current (DC) link, a source conductor coupled between the phase leg and the DC link, a return conductor coupled between the phase leg and the DC link. A commutation loop having an inductance is defined, at least in part, by the source and return conductors. A conductive inductance reducer is disposed in the commutation loop to reduce the inductance of the commutation loop.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Embodiments of the present disclosure relate to loop inductance in electrical circuits. More particularly, the exemplary embodiments relate to systems and methods for reducing loop inductance in electrical circuits. Exemplary inductance reducers are positioned within or adjacent to an inductive loop to reduce the inductance of the loop.

Figure 1:
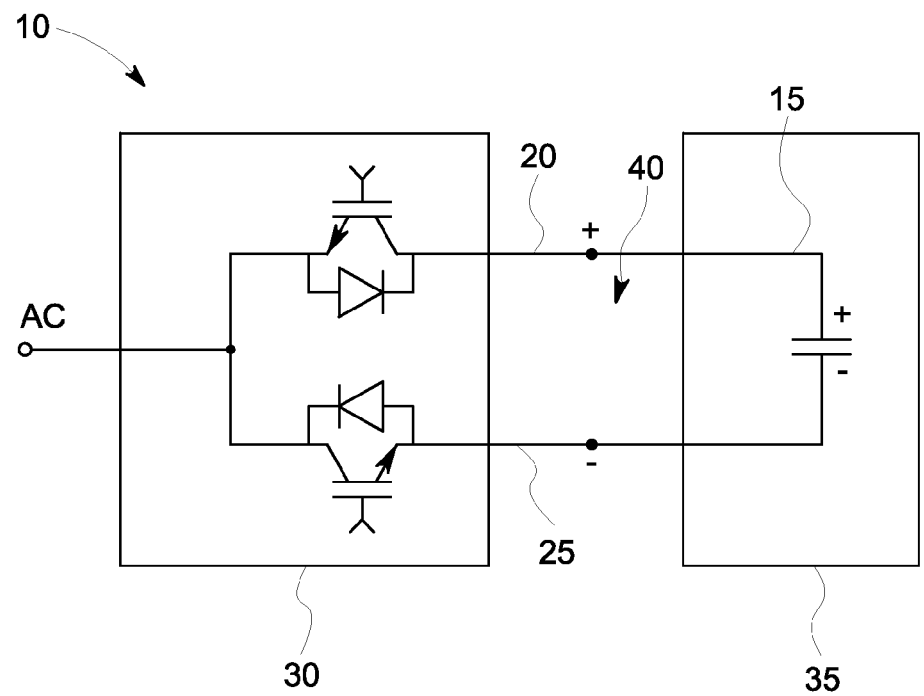
FIG. 1 is an exemplary known converter phase leg connected to a direct current (DC) link.
Figure 2:
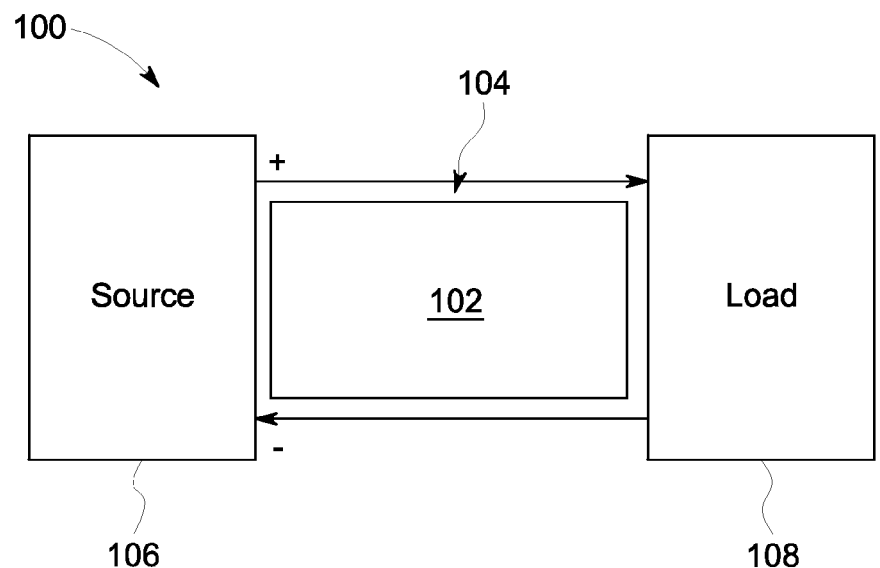
FIG. 2 is a block diagram of an exemplary system including an inductance reducer disposed in a commutation loop between a source and a load.

FIG. 2 is a block diagram of an exemplary system 100 including a conductive inductance reducer 102 disposed proximate a commutation loop 104 between a source 106 and a load 108. Conductive inductance reducer 102 is disposed in a sufficiently close relationship with commutation loop 104 to be electromagnetically coupled with commutation loop 104. In the exemplary embodiment, conductive inductance reducer 102 is disposed within commutation loop 104. In other embodiments, conductive inductance reducer 102 extends outside of commutation loop 104. In some embodiments, conductive inductance reducer 102 is disposed near commutation loop 104, such as adjacent to or overlying commutation loop 104.

Conductive inductance reducer 102 is a passive component that interacts with the magnetic fields produced by electric current traveling around commutation loop 104 to reduce the inductance of commutation loop 104. More specifically, conductive inductance reducer 102 substantially cancels out the magnetic fields generated by current through commutation loop 104 and passing through conductive inductance reducer 102. Thus, the magnetic fields produced within commutation loop 104 are reduced by an amount substantially proportional to the percentage of commutation loop 104 occupied by conductive inductance reducer 102.

Figure 3:
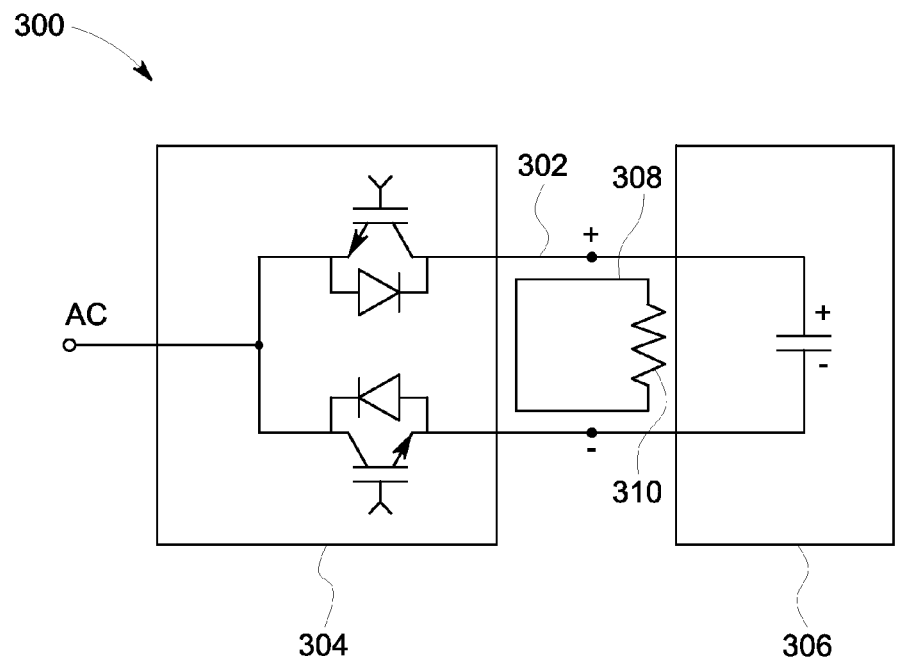
FIG. 3 is an exemplary system including a conductive loop inductance reducer disposed within a commutation loop of a converter phase leg connected to a DC link.

FIG. 3 is an exemplary system 300 including a commutation loop 302 between a converter phase leg 304 and a DC link 306. Exemplary system 300 is a portion of a power converter, such as, without limitation, an inverter. In the exemplary embodiment, inductance reducer 102 is a conductive loop inductance reducer 308 disposed within commutation loop 302. Conductive loop inductance reducer 308 is configured (e.g., sized and positioned) to surround substantially all of the area of commutation loop 302 and to be electromagnetically coupled to commutation loop 302 to reduce the inductance of commutation loop 302. In other embodiments, conductive loop inductance reducer 308 overlaps or extends beyond some or all of commutation loop 302.

Conductive loop inductance reducer 308 is a loop of an electrical conductor. In other implementations, conductive loop inductance reducer 308 includes more than one loop of electrical conductor connected in series, parallel, or series and parallel. In the exemplary embodiment, conductive loop inductance reducer 308 is a loop of insulated wire. In other embodiments, conductive loop inductance reducer 308 is a conductive trace on a circuit board, conductive rods, or any other electrically conductive loop suitable for use as a conductive loop inductance reducer. In the exemplary embodiment, conductive loop inductance reducer 308 is made of copper. In other embodiments, conductive loop inductance reducer 308 includes any other suitable conductive material or combination of materials.

In some embodiments, conductive loop inductance reducer 308 is configured to include a resistive component 310. Resistive component 310 may be a discrete resistor coupled in series with the loop of conductive loop inductance reducer 308 or may be an integral characteristic of conductive loop inductance reducer 308 by appropriate selection of conductor size, length, and the like. Resistive component 310 in conductive loop inductance reducer 308 provides some additional damping during switching transitions to limit voltage overshoot and ringing.

In the exemplary embodiment, conductive loop inductance reducer 308 is galvanically isolated. In other embodiments, conductive loop inductance reducer 308 is galvanically connected to ground, a node of the circuit in which it is located, or any other suitable reference.

Figure 4:
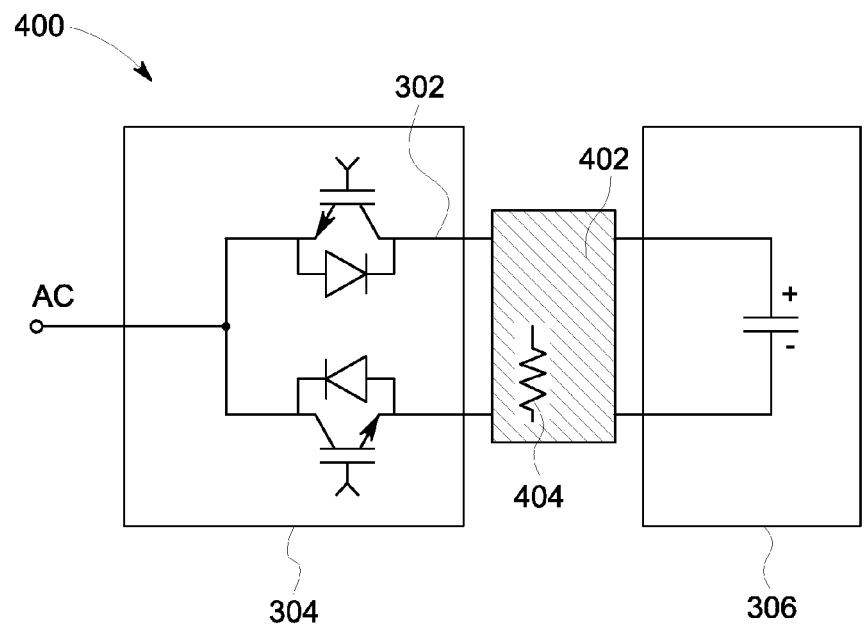
FIG. 4 is an exemplary system including a conductive plate inductance reducer disposed over commutation loop of a converter phase leg connected to a DC link.

FIG. 4 is an exemplary system 400 similar to system 300 and including commutation loop 302 between converter phase leg 304 and DC link 306. Exemplary system 400 is a portion of a power converter, such as, without limitation, an inverter. In exemplary system 400, inductance reducer 102 is a conductive plate inductance reducer 402 disposed proximate commutation loop 302. Conductive plate inductance reducer 402 is disposed adjacent to commutation loop 302 and electromagnetically coupled to commutation loop 302 to reduce the inductance of commutation loop 302. Conductive plate inductance reducer 402 is configured (e.g., sized and positioned) to overlie substantially all of commutation loop 302 and to extend beyond at least part of commutation loop 302. In other embodiments, conductive plate inductance reducer 402 is configured to lie completely within or overlap portions of commutation loop 302.

Conductive plate inductance reducer 402 is a plate of an electrically conductive material. In other implementations, conductive plate inductance reducer 402 includes more than one plate connected in series, parallel, or series and parallel. In some embodiments, conductive plate inductance reducer 402 is a conductive trace/area on a circuit board. In the exemplary embodiment, conductive plate inductance reducer 402 is made of copper. In other embodiments, conductive plate inductance reducer 402 includes any other suitable conductive material or combination of materials.

In some embodiments, conductive plate inductance reducer 402 is configured to include a resistive component 404. Resistive component 404 may be a discrete resistor coupled to conductive plate inductance reducer 402 or may be an integral characteristic of conductive plate inductance reducer 402 by appropriate selection of the plate thickness, size, material, and the like. Resistive component 404 in conductive plate inductance reducer 402 provides some additional damping during switching transitions to limit voltage overshoot and ringing.

In the exemplary embodiment, conductive plate inductance reducer 402 is galvanically isolated. In other embodiments, conductive plate inductance reducer 402 is galvanically connected to ground, a node of the circuit in which it is located, or any other suitable reference.

The exemplary conductive inductance reducers described herein negate a significant portion of the magnetic flux through the interior of a commutation loop, thereby reducing the inductance of the commutation loop. When the exemplary conductive inductance reducers are used in connection with switching circuits, the reduced inductance typically reduces voltage overshoot and ringing during switching transitions. Moreover, some exemplary conductive inductance reducers include a resistive component to provide additional dampening to the circuits in which the conductive inductance reducers are included.

Exemplary embodiments of the systems and methods are described above in detail. The systems and methods are not limited to the specific embodiments described herein, but rather, components of the systems and/or steps of the methods may be utilized independently and separately from other components and/or steps described herein. For example, the system may also be used in combination with other apparatus, systems, and methods, and is not limited to practice with only the system as described herein. Rather, the exemplary embodiment can be implemented and utilized in connection with many other applications. Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A circuit comprising:
   a first component having a plurality of semiconductor switches;
   a second component comprising a direct current (DC) capacitor;
   a source conductor coupled between said first component and said second component;
   a return conductor coupled between said first and second components, wherein a commutation loop having an inductance is defined, at least in part, by said source and return conductors;
   a conductive inductance reducer disposed proximate the commutation loop and electromagnetically coupled to the commutation loop to reduce the inductance of the commutation loop;
   wherein the conductive inductance reducer comprises a conductive loop of an insulated wire; and
   wherein said conductive inductance reducer includes a resistive component which is designed to provide a damping during switching transitions.

2. The circuit according to claim 1, wherein said conductive inductance reducer is disposed within the commutation loop.

3. The circuit according to claim 1, wherein said conductive inductance reducer is disposed adjacent the commutation loop and overlies and extends outside at least part of the commutation loop.

4. The circuit according to claim 1, wherein said conductive loop inductance reducer includes one of a plurality of series connected loops, and a plurality of series and parallel connected loops.

5. The circuit according to claim 1, wherein said conductive inductance reducer is galvanically coupled to one of ground and a node in the circuit.

6. A power converter comprising:
   a phase leg;
   a direct current (DC) link;
   a source conductor coupled between said phase leg and said DC link;
   a return conductor coupled between said phase leg and said DC link, wherein a commutation loop having an inductance is defined, at least in part, by said source conductor and said return conductor;
   a conductive inductance reducer disposed proximate said commutation loop and electromagnetically coupled to said commutation loop to reduce the inductance of said commutation loop;
   wherein the conductive inductance reducer comprises a conductive loop of insulated wire; and
   wherein said conductive inductance reducer includes a resistive component which is designed to provide a damping during switching transitions.

7. The power converter according to claim 6, wherein said phase leg comprises at least one switch and said DC link comprises at least one capacitor.

8. The power converter according to claim 6, wherein said conductive inductance reducer is disposed within said commutation loop.

9. The power converter according to claim 6, wherein said conductive inductance reducer is disposed adjacent said commutation loop and overlies and extends beyond at least a portion of said commutation loop.

10. A method for reducing an inductance of a circuit including a commutation loop defined at least in part by a source conductor and a return conductor, the source conductor and the return conductor extending between a first component and a second component, said method comprising:
    disposing a conductive inductance reducer proximate the commutation loop to electromagnetically couple the conductive inductance reducer to the commutation loop, the conductive inductance reducer including a conductive loop of insulated wire;
    wherein disposing a conductive inductance reducer proximate the commutation loop comprises disposing a conductive inductance reducer including a resistive component proximate the commutation loop; and
    wherein the resistive component is designed to provide a damping during switching transitions.

11. The method according to claim 10, wherein disposing a conductive inductance reducer proximate the commutation loop comprises disposing a conductive inductance reducer within the commutation loop.

12. The method according to claim 10, further comprising galvanically coupling the conductive inductance reducer to one of ground and a node in the circuit.

* * * * *